US012687287B2

(12) United States Patent
Sincic et al.

(10) Patent No.: US 12,687,287 B2
(45) Date of Patent: Jul. 21, 2026

(54) FAN COOLED PORTABLE LIGHT PANEL

(71) Applicant: Videndum Production Solutions Inc., Shelton, CT (US)

(72) Inventors: Andrew John Sincic, Oxford, CT (US); Jim Markland, Stratford, CT (US); David Pasko, Middlebury, CT (US); Michael Herbert, London (GB); Jiajie Qian, Shanghai (CN); Linggang Zeng, Shanghai (CN); David Jervis, Madison, CT (US); Benjamin Rosenfeld, Shelton, CT (US)

(73) Assignee: Videndum Production Solutions Inc., Shelton, CT (US)

( * ) Notice: Subject to any disclaimer, the term of this patent is extended or adjusted under 35 U.S.C. 154(b) by 0 days.

(21) Appl. No.: 18/946,361

(22) Filed: Nov. 13, 2024

(65) Prior Publication Data

US 2025/0155115 A1 May 15, 2025

Related U.S. Application Data

(60) Provisional application No. 63/572,835, filed on Apr. 1, 2024, provisional application No. 63/598,436, filed on Nov. 13, 2023.

(51) Int. Cl.
*F21V 29/508* (2015.01)
*F21V 15/01* (2006.01)
(Continued)

(52) U.S. Cl.
CPC ............ *F21V 29/508* (2015.01); *F21V 15/01* (2013.01); *F21V 29/673* (2015.01); *F21V 29/74* (2015.01); *F21Y 2115/10* (2016.08)

(58) Field of Classification Search
CPC ...... F21V 29/508; F21V 29/502; F21V 29/50; F21Y 2105/16; F21Y 2105/10; F21Y 2105/14
See application file for complete search history.

(56) References Cited

U.S. PATENT DOCUMENTS

| | | | | |
|---|---|---|---|---|
| 6,688,759 B1 * | 2/2004 | Hadjimichael ........ | A01G 9/249 362/406 |
| 8,297,782 B2 * | 10/2012 | Bafetti .................. | A01G 7/045 362/253 |

(Continued)

FOREIGN PATENT DOCUMENTS

| | | |
|---|---|---|
| CN | 108343937 A | 7/2018 |
| CN | 212160329 U | 12/2020 |

OTHER PUBLICATIONS

European Office Action for Application No. 24212807.2, dated Apr. 15, 2025, 9 pages.

*Primary Examiner* — Ismael Negron
(74) *Attorney, Agent, or Firm* — McCarter & English, LLP

(57) ABSTRACT

A portable light panel includes a housing having a rear portion, a front portion and peripheral portions between the front and rear portions, the peripheral portions include air intake openings, and the housing defines an air intake chamber. A light emitting panel and electronic components to control the light emitted by the light-emitting panel are also provided in the light panel. The electronic components are located proximate the air intake chamber between the housing and the light emitting panel. Ambient air is drawn into the air intake chamber and directed onto the electronic components to maintain the electronic components at a desired operating temperature.

10 Claims, 18 Drawing Sheets

(51) Int. Cl.

| | |
|---|---|
| ***F21V 29/67*** | (2015.01) |
| ***F21V 29/74*** | (2015.01) |
| *F21Y 115/10* | (2016.01) |

(56) References Cited

U.S. PATENT DOCUMENTS

| | | | | |
|---|---|---|---|---|
| 9,039,223 | B2 * | 5/2015 | Rudd | F21V 29/507 362/249.02 |
| 9,109,784 | B2 * | 8/2015 | Lee | F21V 29/767 |
| 9,404,648 | B2 * | 8/2016 | Druchinin | F21V 23/04 |
| 9,839,206 | B2 * | 12/2017 | Lawyer | F21V 29/67 |
| 10,222,046 | B2 * | 3/2019 | Brumm | F21V 29/763 |
| 10,760,748 | B2 * | 9/2020 | Liu | F21V 29/60 |
| 10,871,275 | B2 * | 12/2020 | Gomez Martinez | F21V 29/74 |
| 2009/0129092 | A1 * | 5/2009 | Chen | F21V 29/503 362/294 |
| 2010/0128473 | A1 | 5/2010 | Parra | |
| 2010/0328950 | A1 * | 12/2010 | Lai | F21V 29/503 362/249.02 |
| 2011/0216536 | A1 * | 9/2011 | Okazaki | F21V 29/677 362/249.02 |
| 2012/0020071 | A1 * | 1/2012 | Mckenzie | F21V 5/048 362/231 |
| 2023/0075501 | A1 | 3/2023 | Gu et al. | |

* cited by examiner

FAN COOLED PORTABLE LIGHT PANEL

CROSS REFERENCE TO RELATED APPLICATIONS

This application claims priority to U.S. Provisional Patent Application No. 63/598,436, filed on Nov. 13, 2023, and titled "PORTABLE LIGHT PANEL", and U.S. Provisional Patent Application No. 63/572,835, filed on Apr. 1, 2024, and which are hereby incorporated by reference in their entirety.

FIELD OF THE DISCLOSURE

The field of disclosure relates generally to a portable light panel and, more particularly, to a portable light panel with direct cooling of electronic components that control the light emitted from the light panel.

BACKGROUND

Portable light panels may be used to provide suitable lighting outside of a studio. The portable light panels may also be used singly or in combination with in-studio light fixtures. When outside of the studio, portable light panels may be used to provide lighting during remote reporting at sporting or non-sporting events, or when filming a movie or show for television, for example. The portable light panels are typically supported by an adjustable stand or frame that enables the vertical position of the attached light to be modified for use at the associated sporting or non-sporting event.

The portable lights include a plurality of light emitting components such as a plurality of light emitting diodes (LED's). The LED's are controlled by circuit board and other electronics (collectively "electrical components") that are located in a portable light housing. During use, the electrical components produce heat that causes their temperature to increase. As a result, the electrical components need to be actively cooled to prevent the operating temperature of the electrical components from rising to a level that would lead to heat-related damage to the components.

In an effort to maintain electrical component temperature at a suitable level, typical portable lights draws cool ambient air into the light housing from the rear of the housing. The air must travel through the housing until it reaches the electrical components. Because the air must travel through the housing, the air passes a number of housing structural components and other components that have an operating temperature that is likely greater than the temperature of the ambient air. As a result, the temperature of the ambient air increases as it moves through the housing toward the electrical components to be cooled. The temperature of the ambient air is lower when the air is drawn into the housing than the temperature of the ambient air when it is flowed against the electrical components. Because the ambient air is at a higher temperature when the air is flowed against the electrical components, the ambient air cools the electrical components less effectively than if the drawn in air was directly flowed against the electrical components. The components would be more effectively cooled if the cool ambient air was drawn into the housing and then directly flowed against the electrical components.

Therefore, there is a need in the art for a portable light panel that draws ambient air into the portable light panel housing and flows the ambient air directly to the electrical components to effectively reduce the operating temperature of the electrical components.

BRIEF DESCRIPTION

The present disclosure describes a portable light that draws ambient air through at least one inlet along the periphery of the portable light, through a flow chamber and against the electrical components of the portable light.

In some embodiments, a portable light panel is disclosed comprising: a housing having a rear portion, a front portion and peripheral portions between the front and rear portions, the peripheral portions including air intake openings, the housing defining an air intake chamber; a light emitting panel; electronic components to control the light emitted by the light-emitting panel, the electronic components being located proximate the air intake chamber between the housing and the light emitting panel, and wherein the ambient air is drawn into the air intake chamber and directed onto the electronic components to maintain the electronic components at a desired operating temperature.

As used herein, "portable light" or "portable light panel", or "light" refers to any portable light structure.

As used herein, "electric components" refers collectively to circuit boards, electric devices, electronics and other electrically powered components.

As used herein, "a", "an", and "the" refer to both singular and plural referents unless the context clearly dictates otherwise.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform in the embodiment described herein. Furthermore, it is also to be understood that the value to which the modifier "about" refers is itself specifically disclosed herein.

As used herein, spatially relative terms, such as "beneath", "below", "lower", "above", "upper", "front", "back", "side", "left", "right", "rear", "top", "bottom", and the like, are used for ease of description to describe one element or feature's relationship to another element(s) or feature(s). It is further understood that the terms "front", "back", "left", and "right" are not intended to be limiting and are intended to be interchangeable, where appropriate. Further, it should be noted that the terms "first," "second," and the like herein do not denote any order, quantity, or relative importance, but rather are used to distinguish one element from another.

As used herein, the terms "comprise(s)", "comprising", and the like, specify the presence of stated features, integers, steps, operations, elements, and/or components, but do not preclude the presence or addition of one or more other features, integers, steps, operations, elements, components, and/or groups thereof.

As used herein, the terms "configure(s)", "configuring", and the like, refer to the capability of a component and/or assembly, but do not preclude the presence or addition of other capabilities, features, components, elements, operations, and any combinations thereof.

All ranges disclosed herein are inclusive of the endpoints, and the endpoints are independently combinable with each other. Each range disclosed herein constitutes a disclosure of any point or sub-range lying within the disclosed range.

All methods described herein can be performed in any suitable order unless otherwise indicated herein or otherwise clearly contradicted by context. The use of any and all examples, or exemplary language (e.g., "such as"), is intended merely to better illustrate the embodiments of the disclosure and does not pose a limitation on the scope of any embodiments unless otherwise claimed.

Any combination or permutation of features, functions and/or embodiments as disclosed herein is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure.

Figure 1:
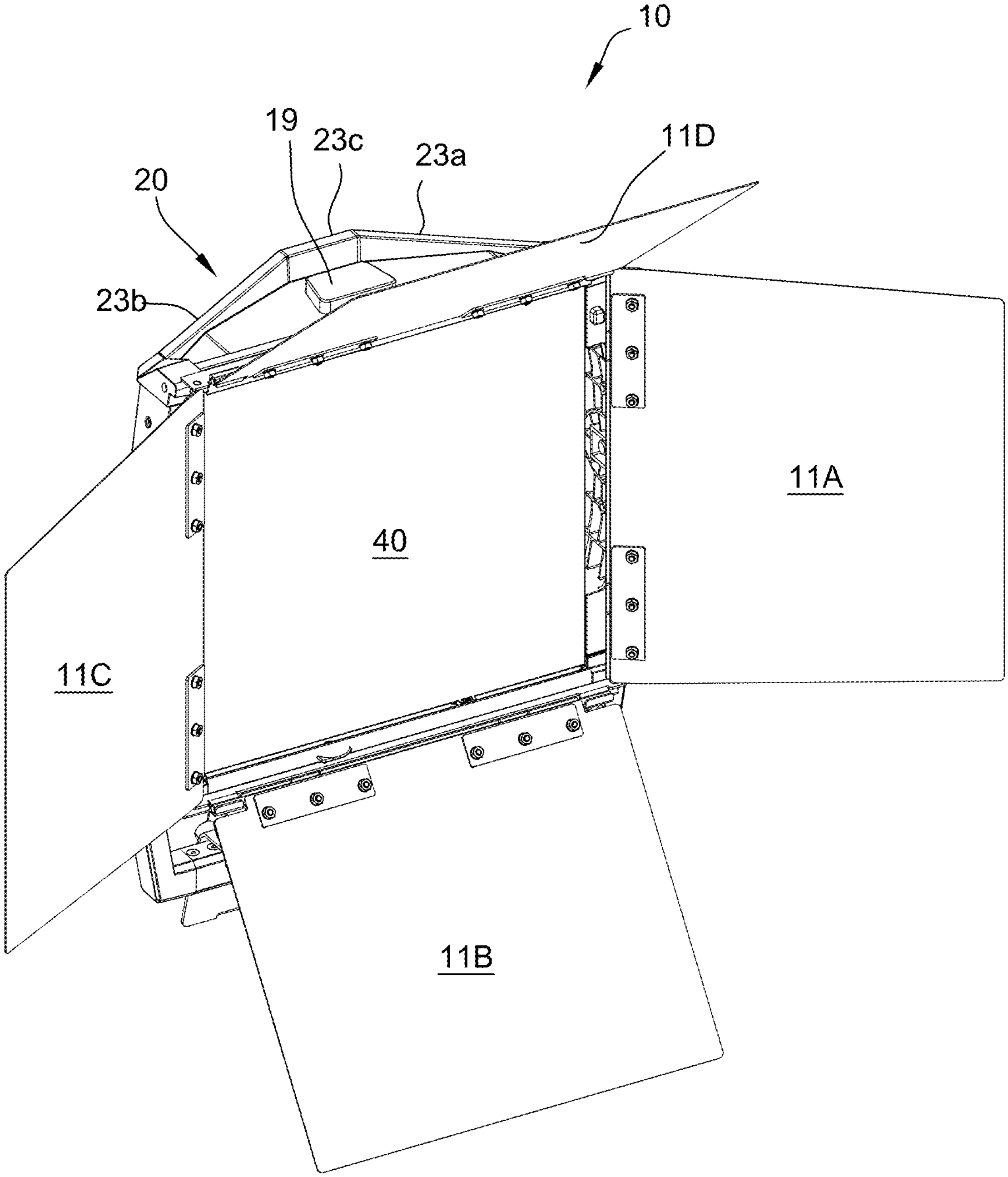

To assist those of ordinary skill in the art in making and using the disclosed assemblies, systems and methods, reference is made to the appended figures, wherein:

FIG. 1 is a perspective view of a portable light panel according to the present disclosure, including optional moveable light directing doors.

Figure 2:
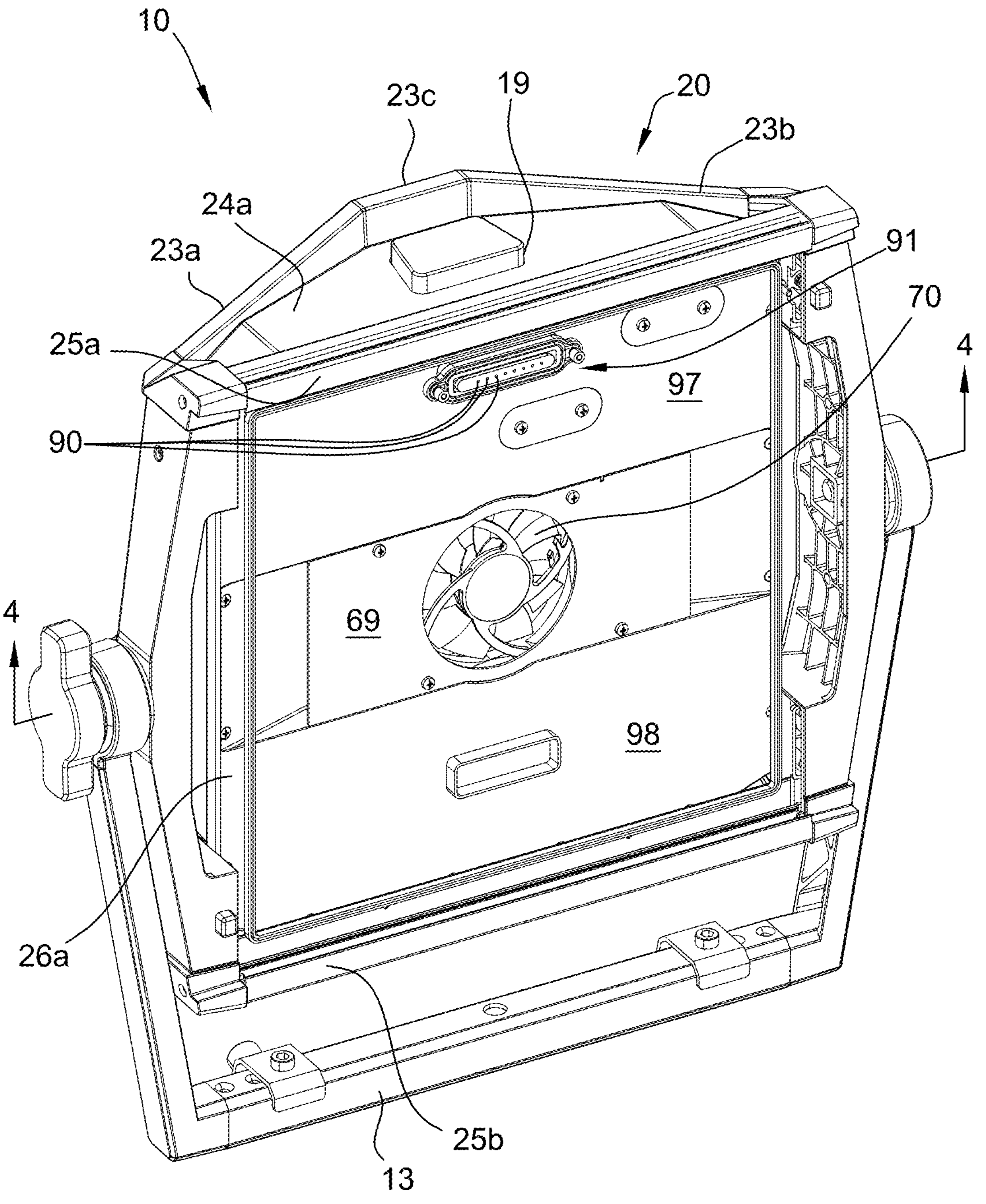

FIG. 2 is a perspective view of the portable light panel of FIG. 1 with the light emitting panel and light directing doors removed according to the present disclosure.

Figure 3:
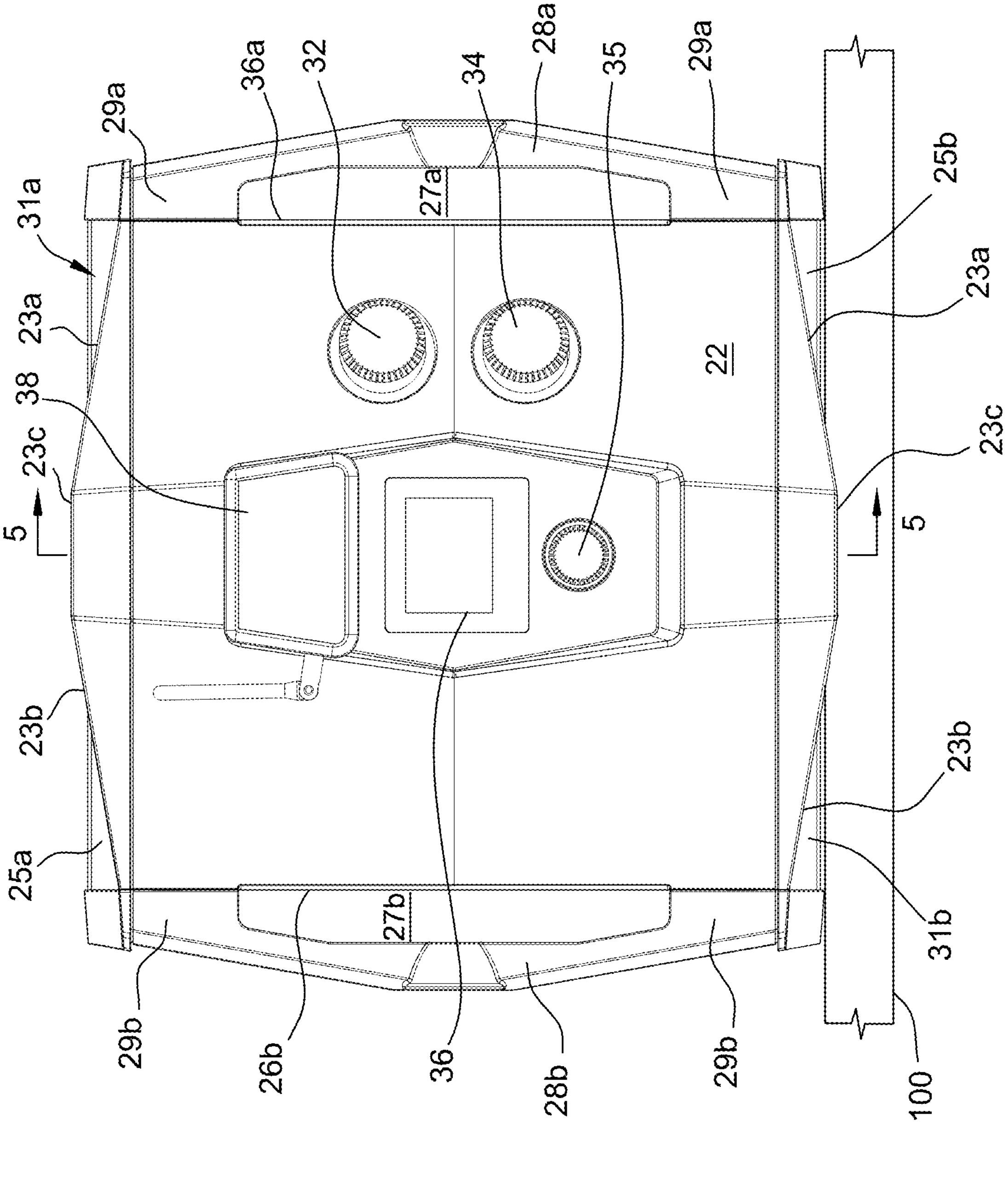

FIG. 3 is a rear view of the portable light panel of FIG. 1, according to the present disclosure.

Figure 4:
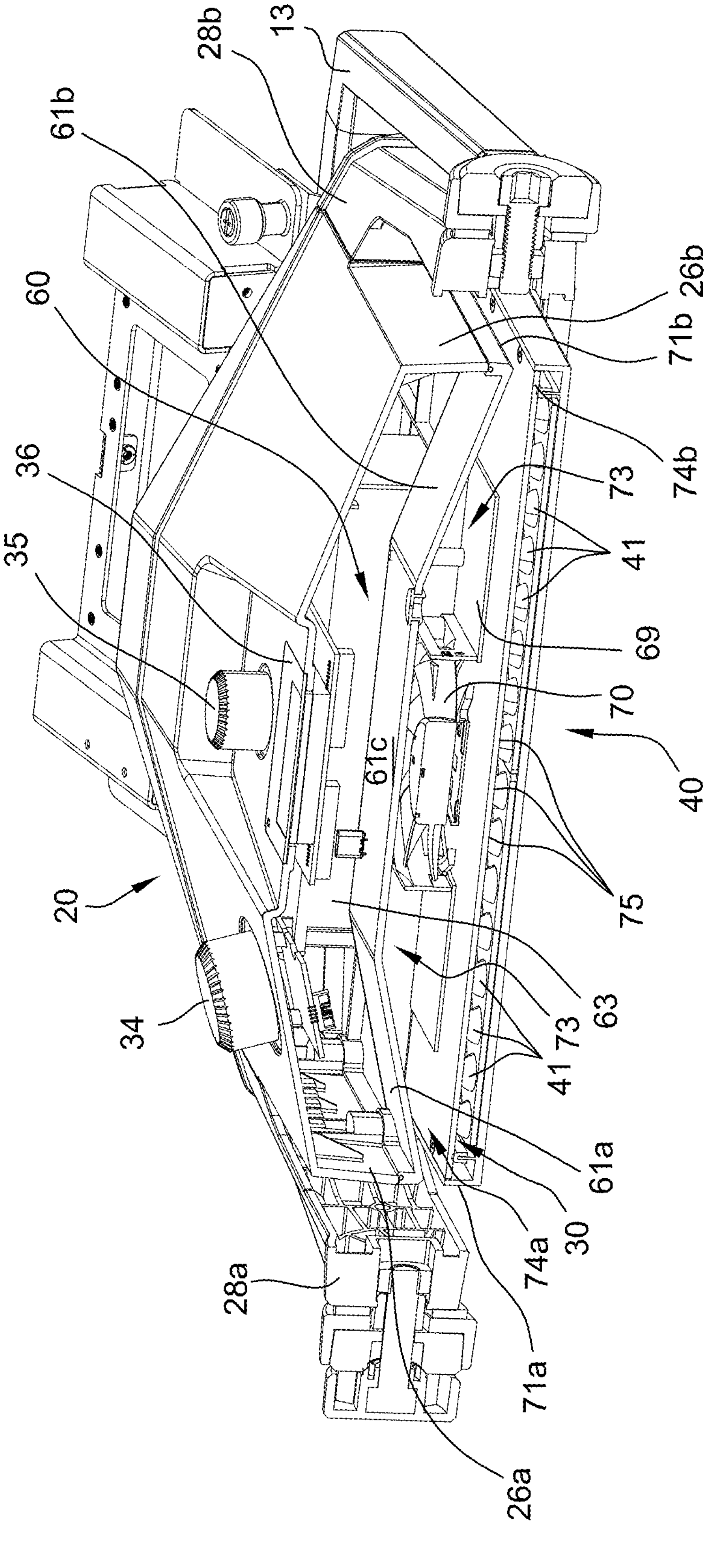

FIG. 4 is a sectional view of the portable light panel and light emitting panel of the present disclosure taken along ling 3-3 of FIG. 2.

Figure 5:
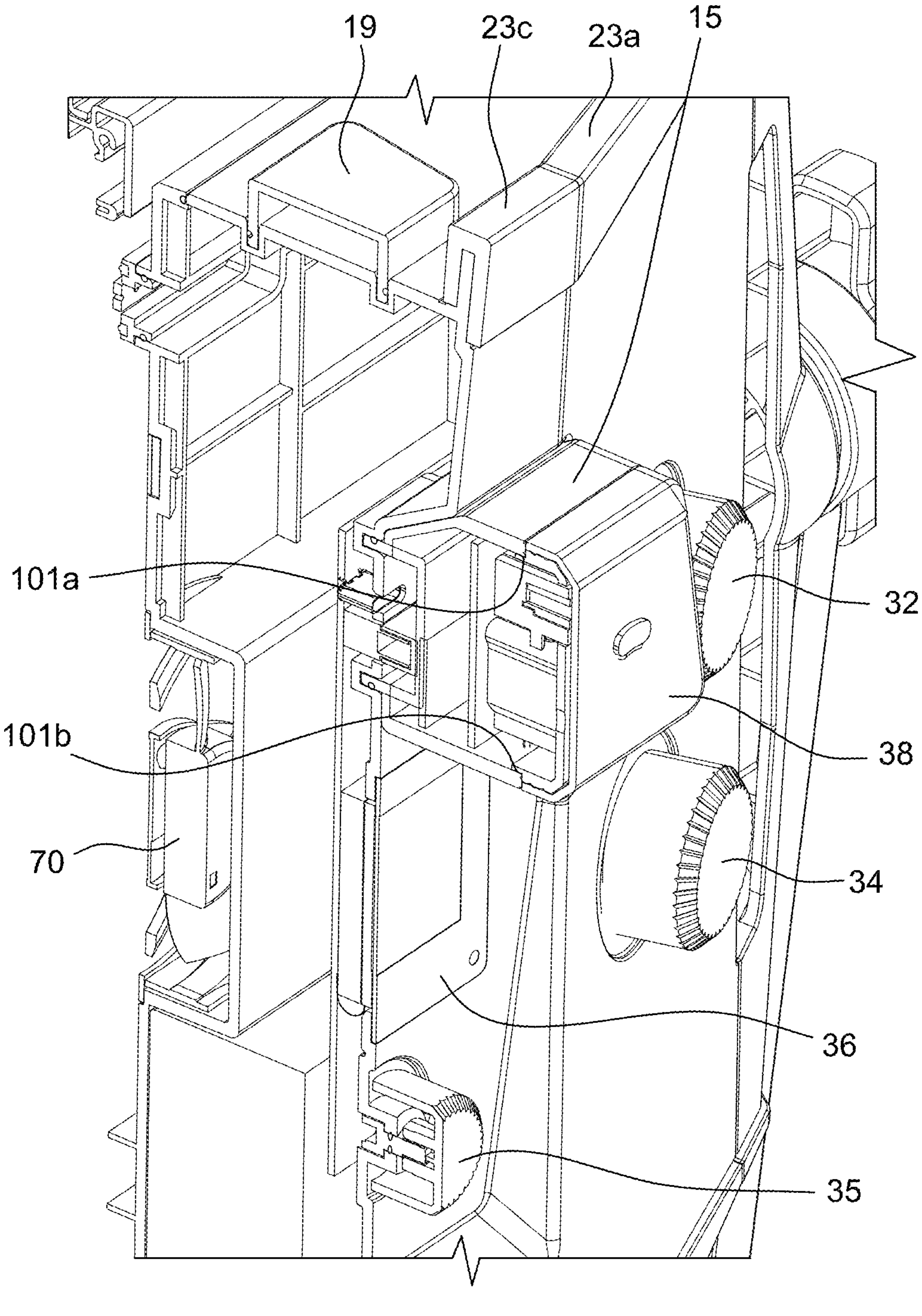

FIG. 5 is a magnified sectional perspective view of the portable light panel according to the present disclosure taken along line 5-5 of FIG. 3.

Figure 6:
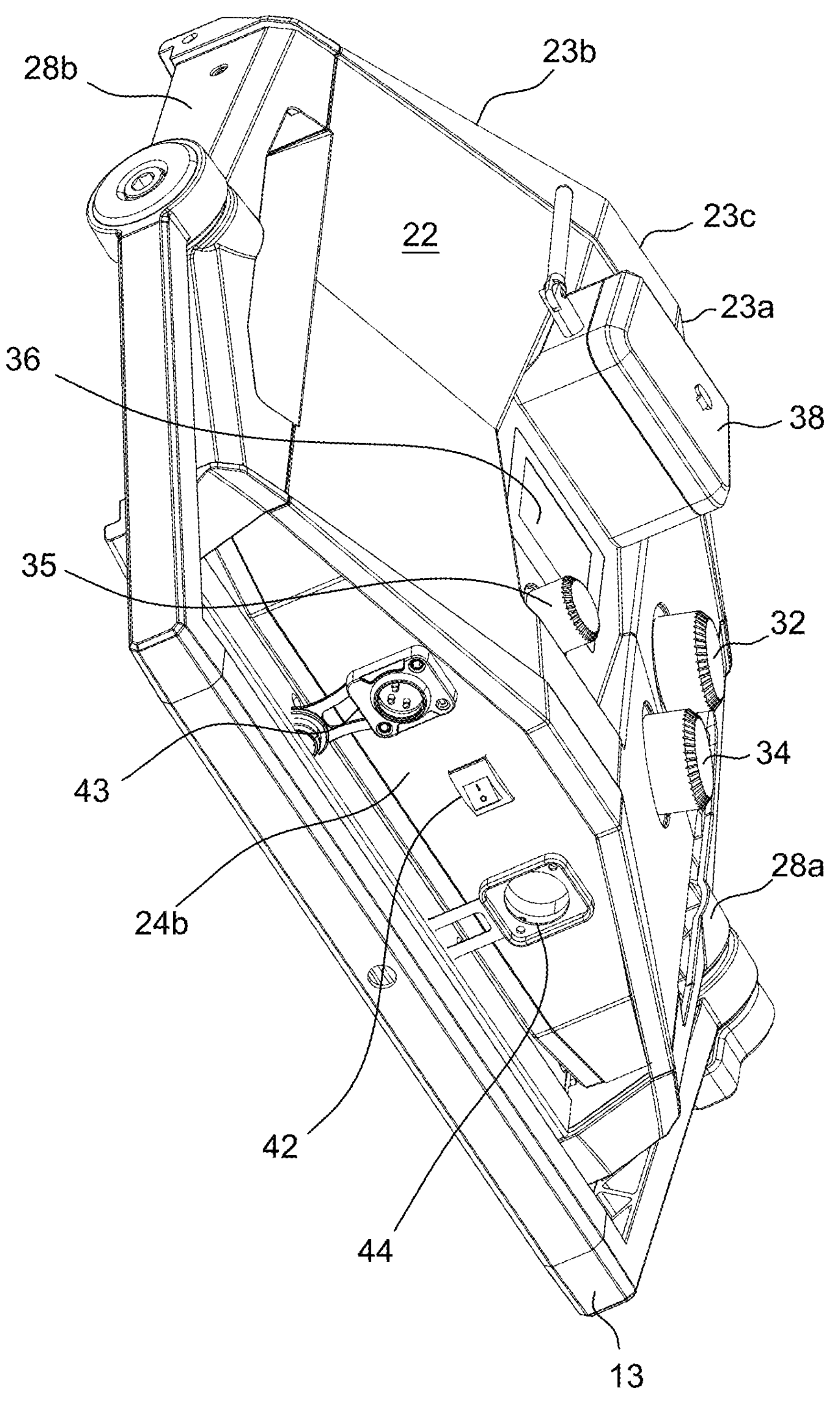

FIG. 6 is a bottom perspective view of the portable light panel of FIG. 1, according to the present disclosure.

Figure 7:
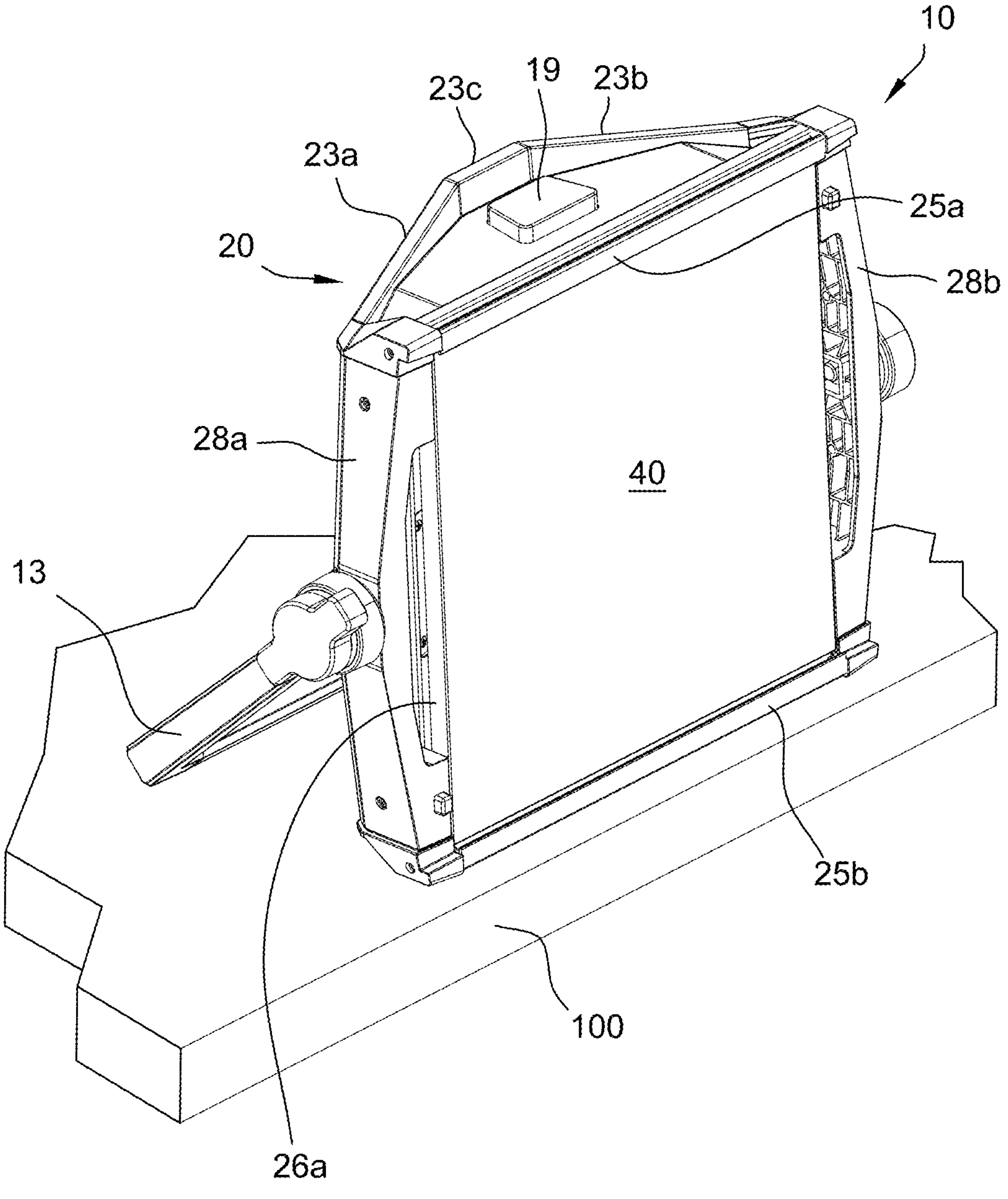

FIG. 7 is a front perspective view of the portable light panel of FIG. 1 with the light directing doors removed and the light panel on a supporting surface, according to the present disclosure.

Figure 8:
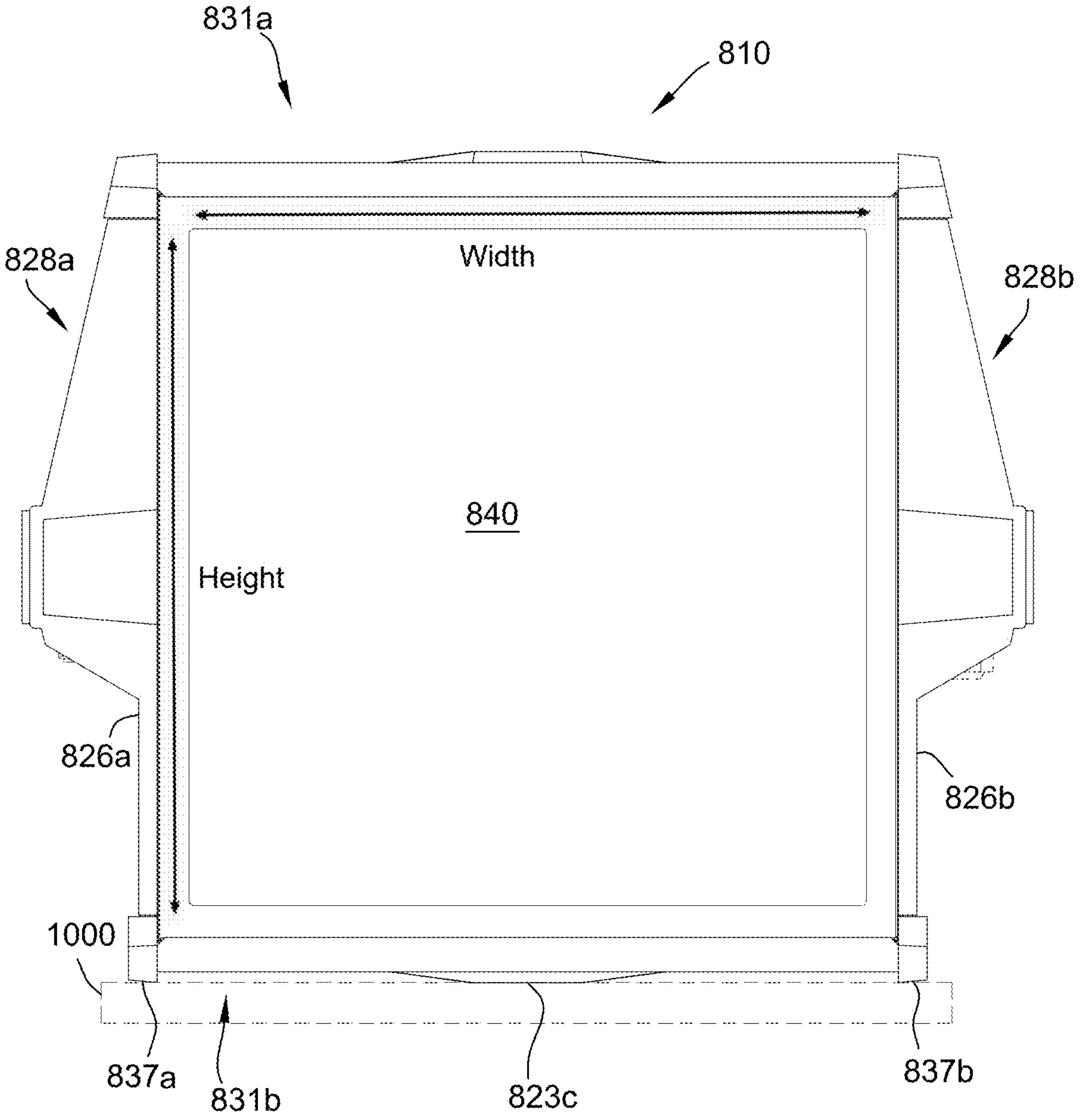

FIG. 8 is a front view of an alternate embodiment portable light panel of the present disclosure.

Figure 9:
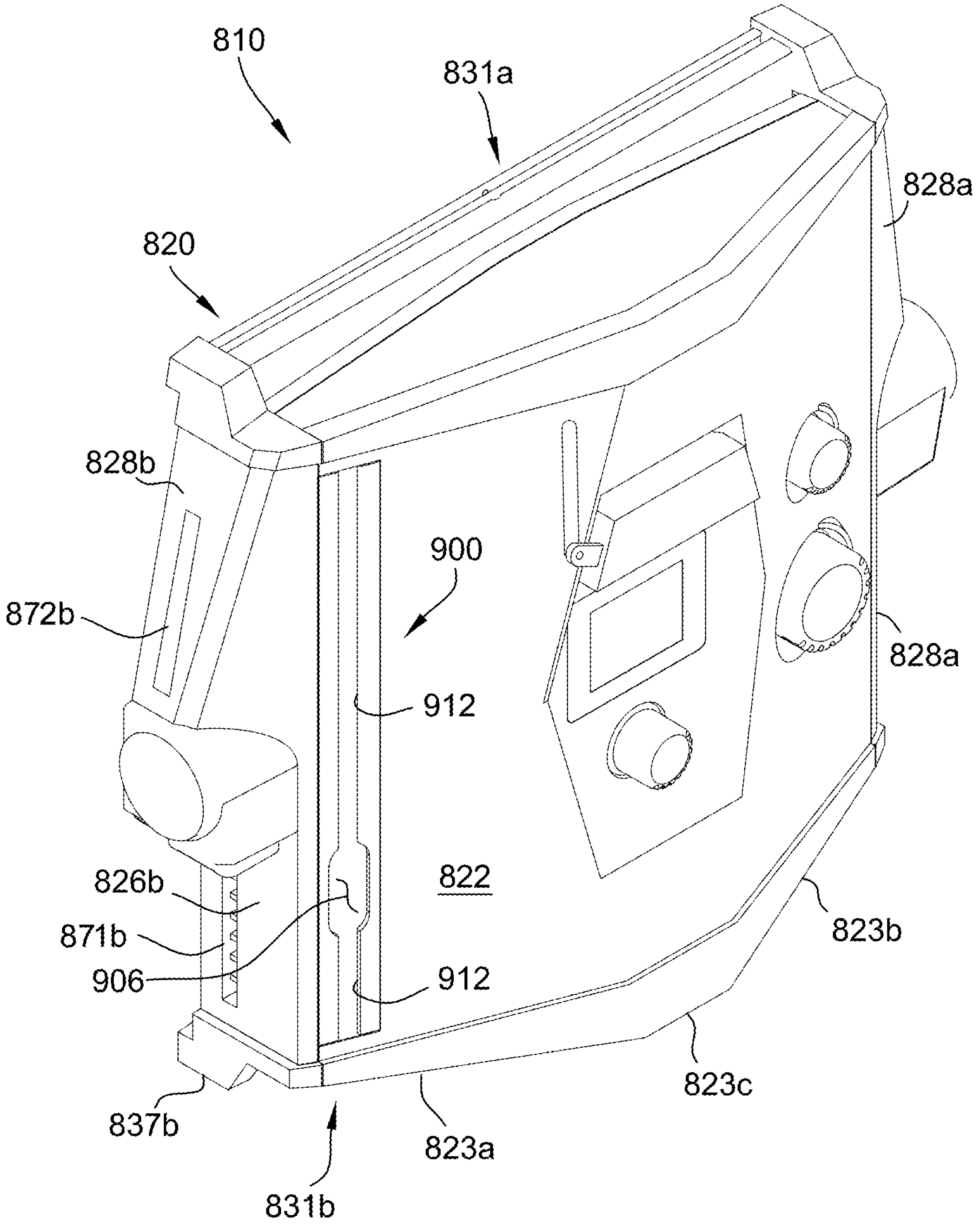

FIG. 9 is a rear isometric view of the alternate embodiment portable light panel of FIG. 8.

Figure 10:
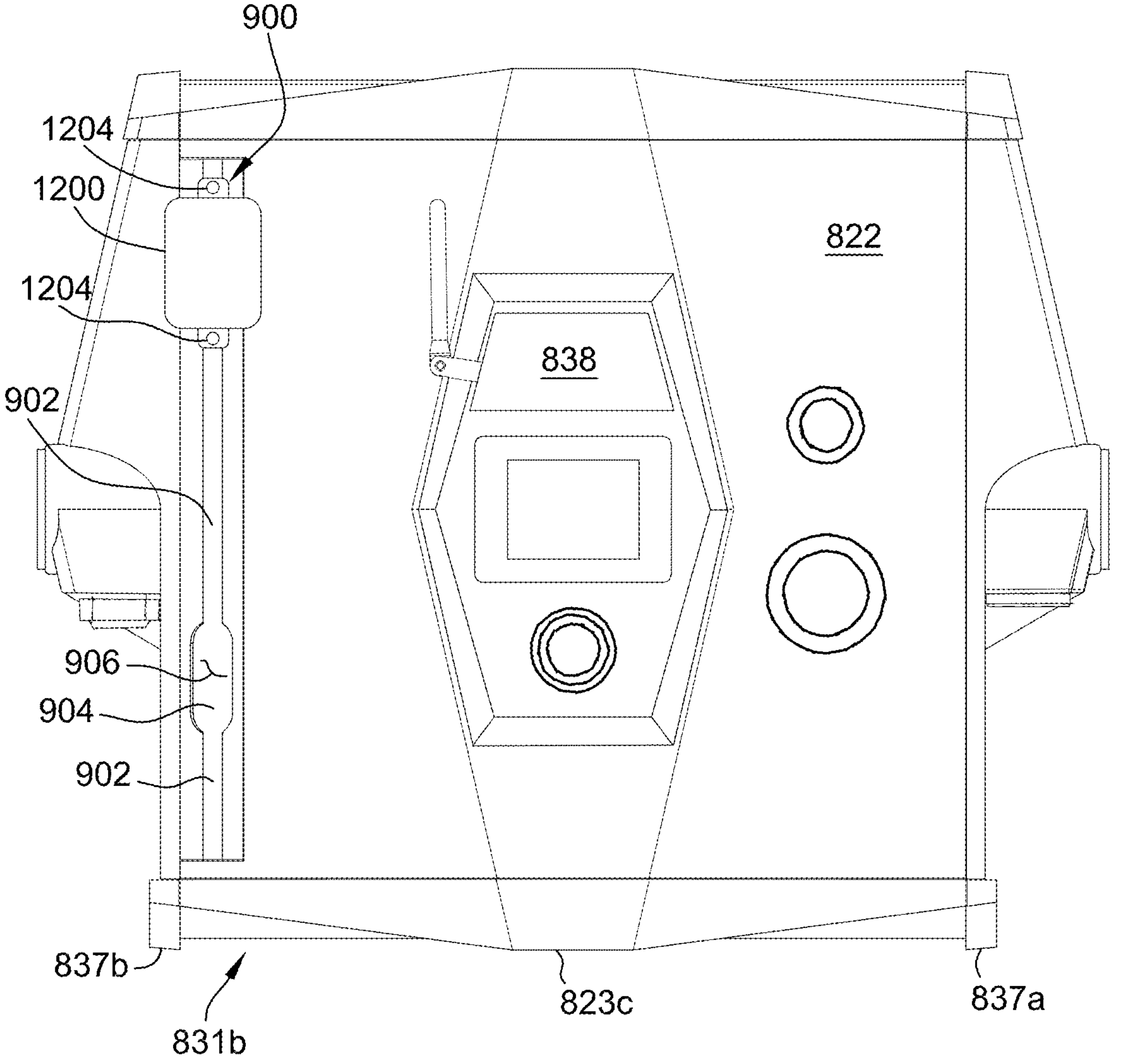

FIG. 10 is a rear view of the alternate portable light panel of FIG. 9.

Figure 11:
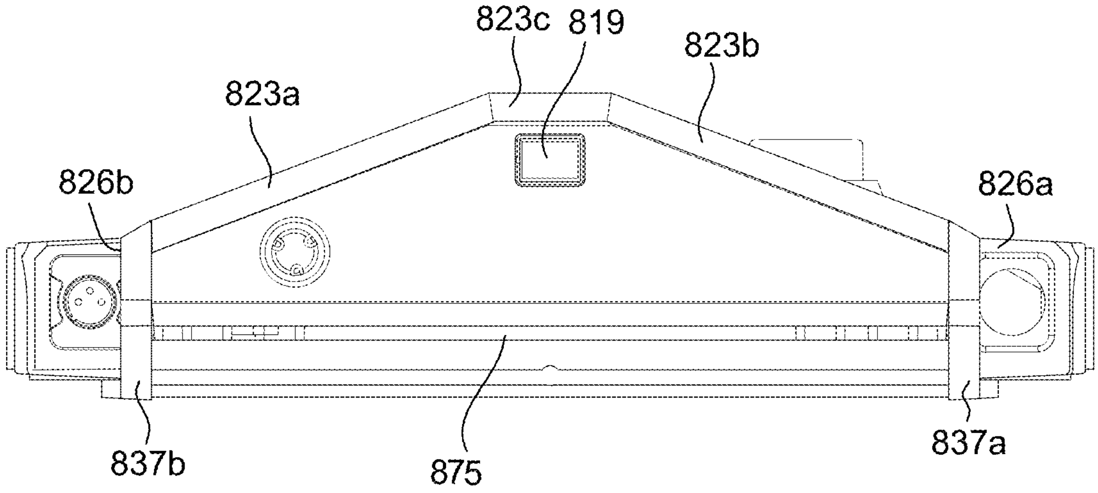

FIG. 11 is a bottom view of the alternate embodiment portable light panel of FIG. 9.

Figure 12:
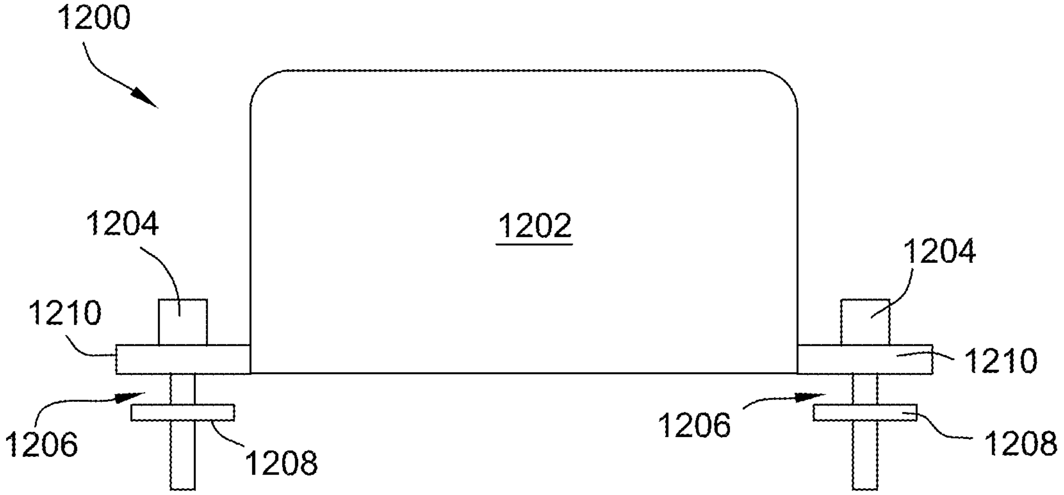

FIG. 12 is a schematic representation of an accessory that may be attached to the portable light of the alternate embodiment of the disclosure.

Figure 13:
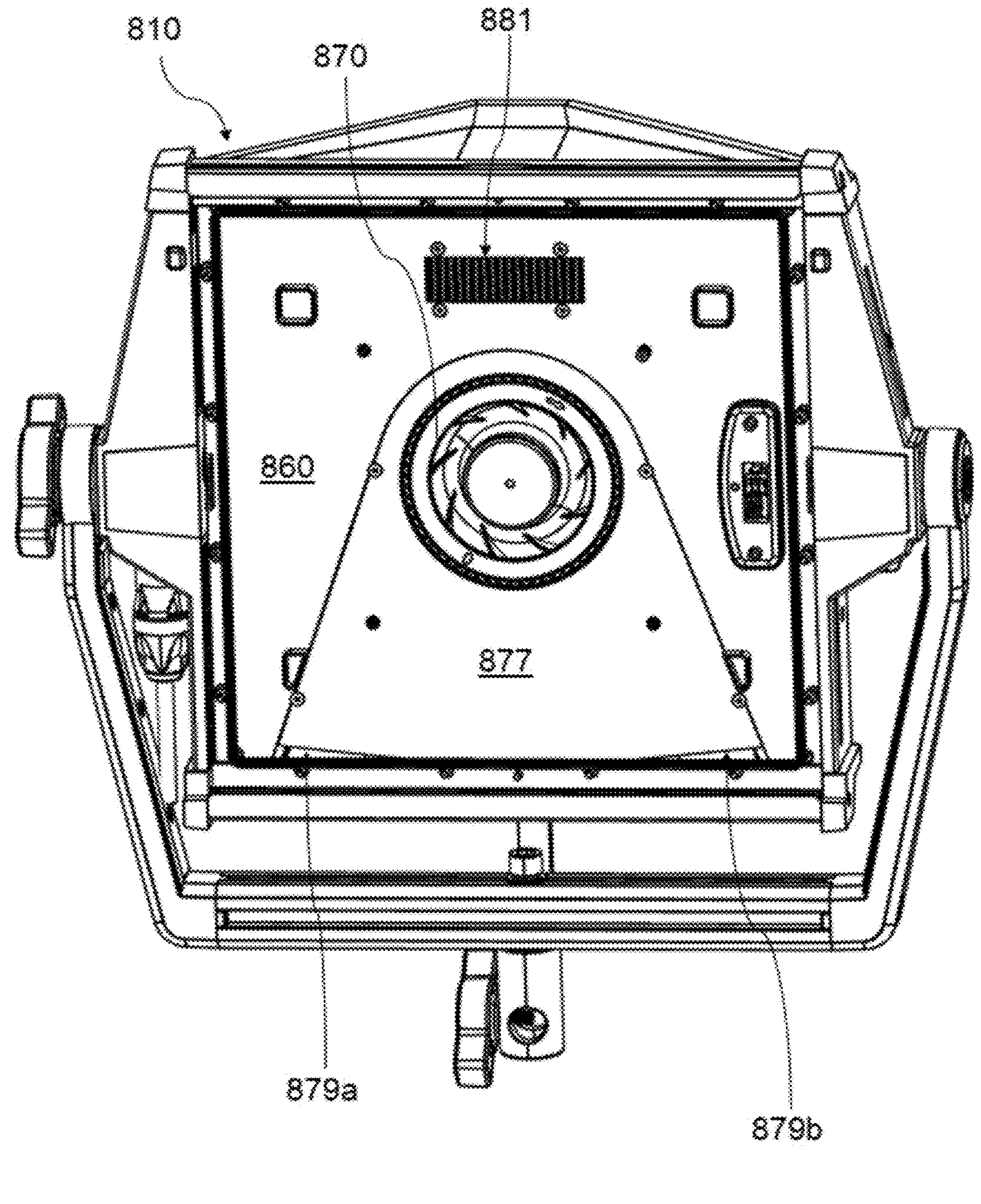

FIG. 13 is a perspective view of the alternate embodiment of the portable light panel of FIG. 8 with light emitting panel and light directing doors removed according to the present disclosure.

Figure 14:
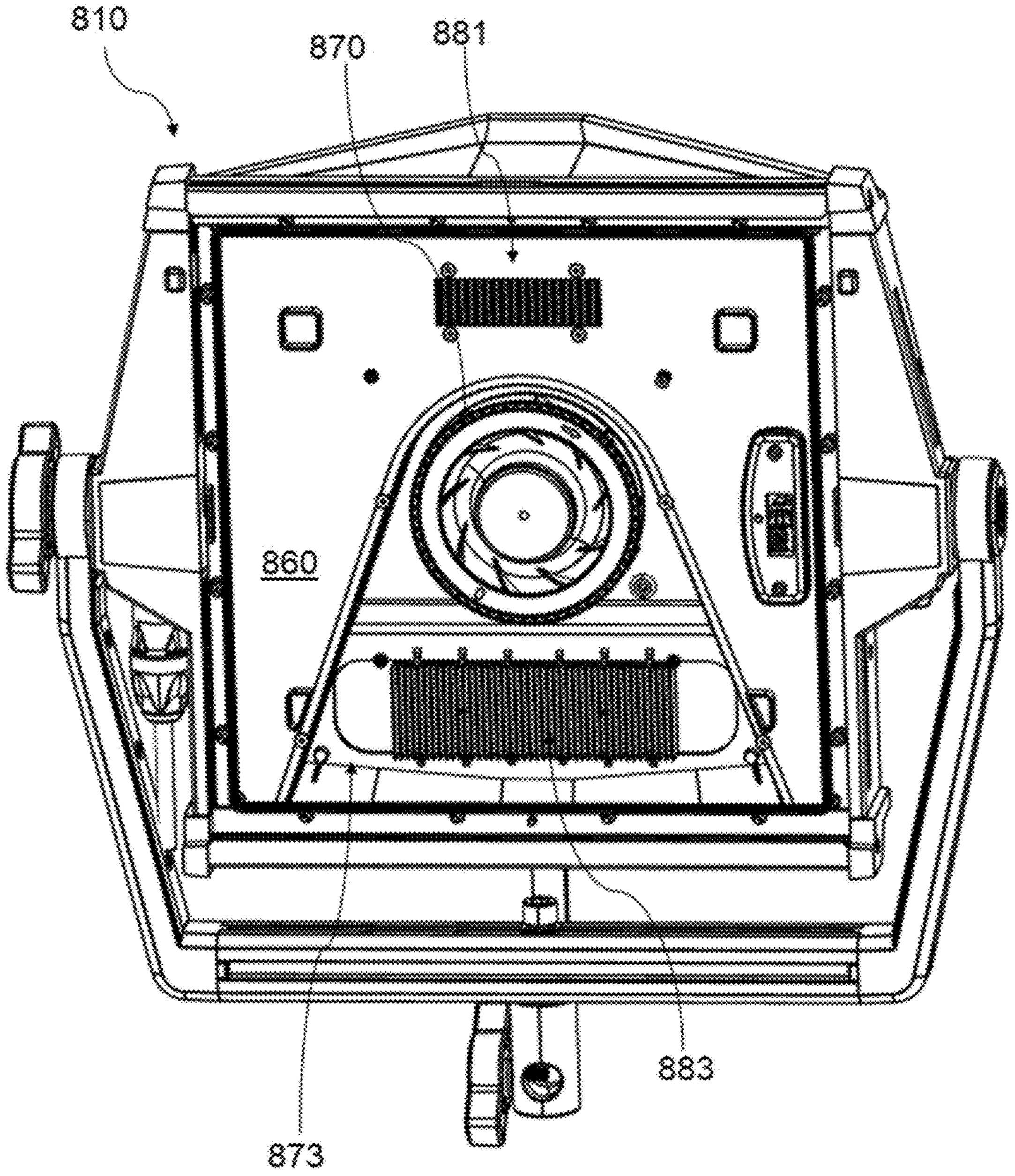

FIG. 14 is a perspective view of the alternate embodiment of the portable light panel of FIG. 8 with a panel removed according to the present disclosure.

Figure 15:
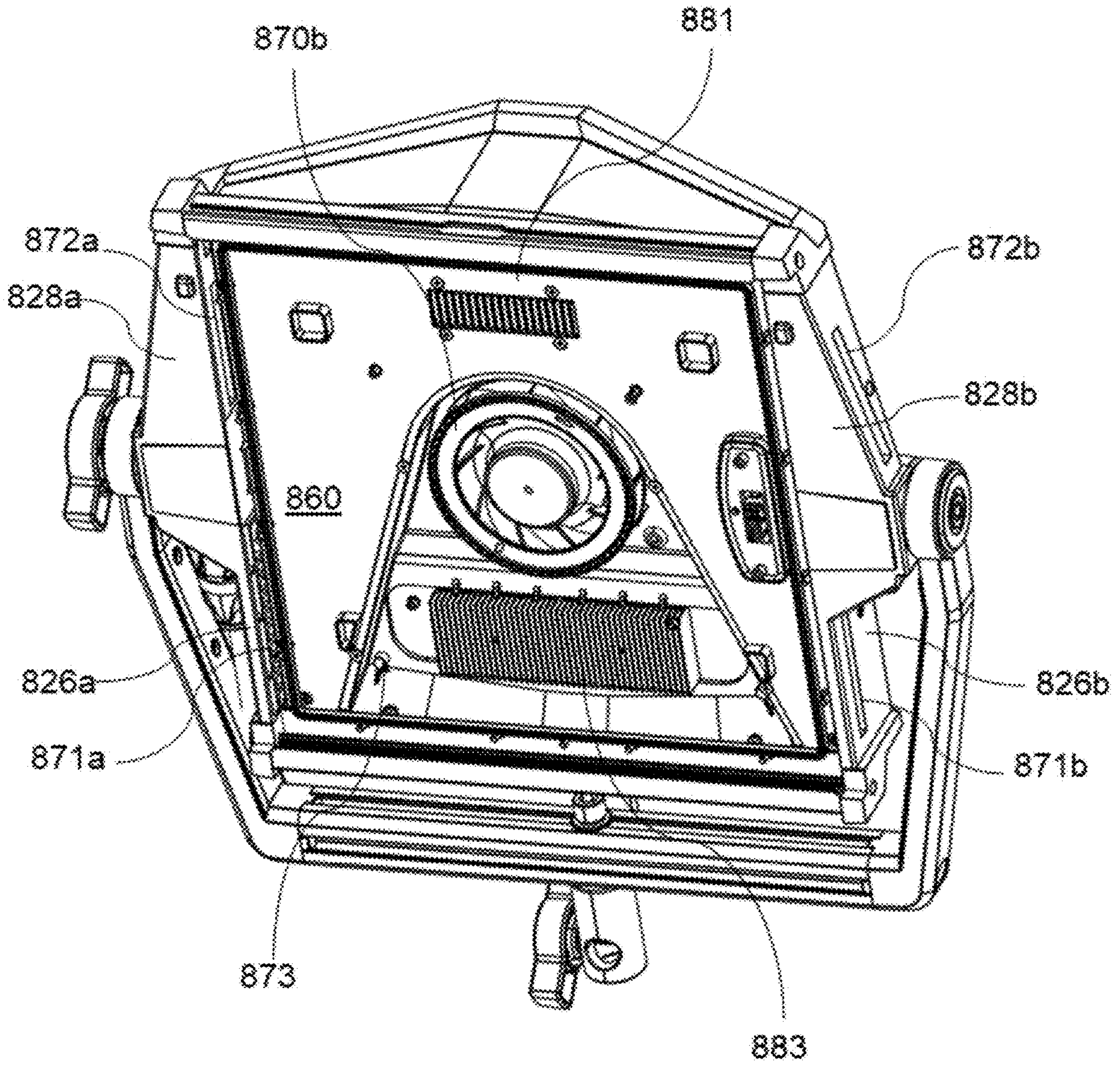
Figure 16:
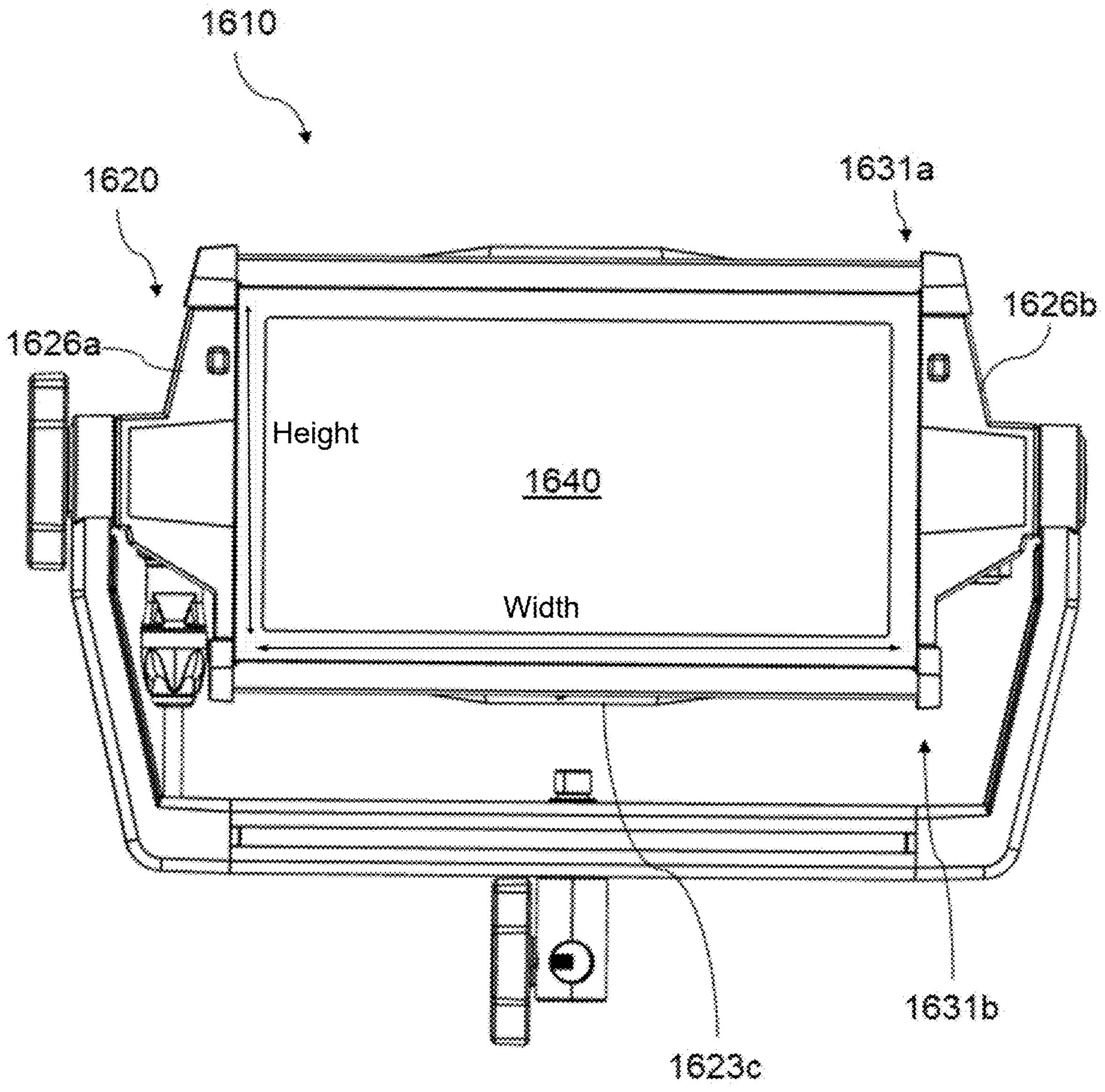

FIG. 15 is a second perspective view of the alternate embodiment of the portable light panel of FIG. 13 with a panel removed according to the present disclosure FIG. 16 is a front view of an alternate embodiment portable light panel of the present disclosure.

Figure 17:
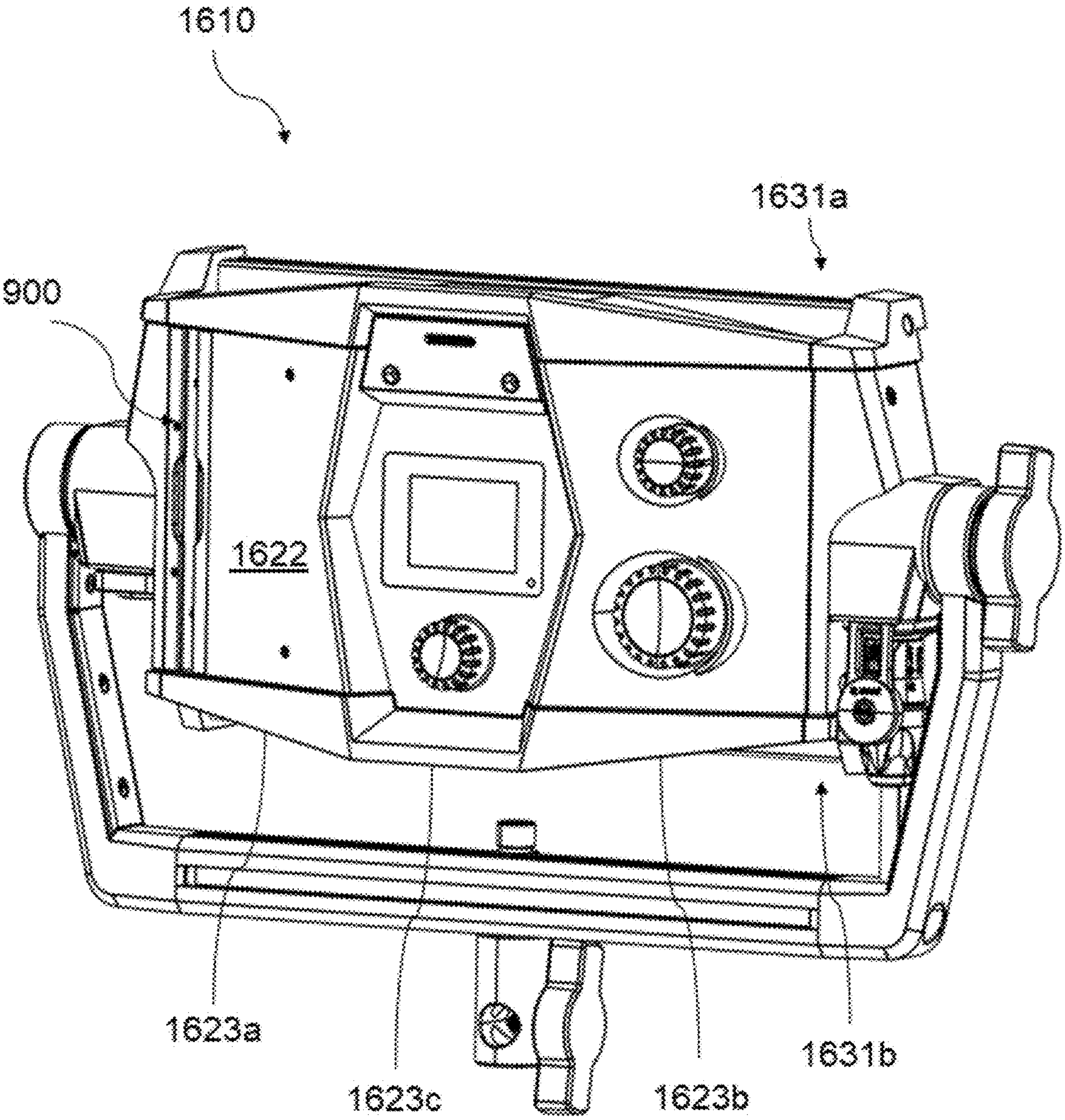

FIG. 17 is a rear isometric view of the alternate embodiment portable light panel of FIG. 16.

Figure 18:
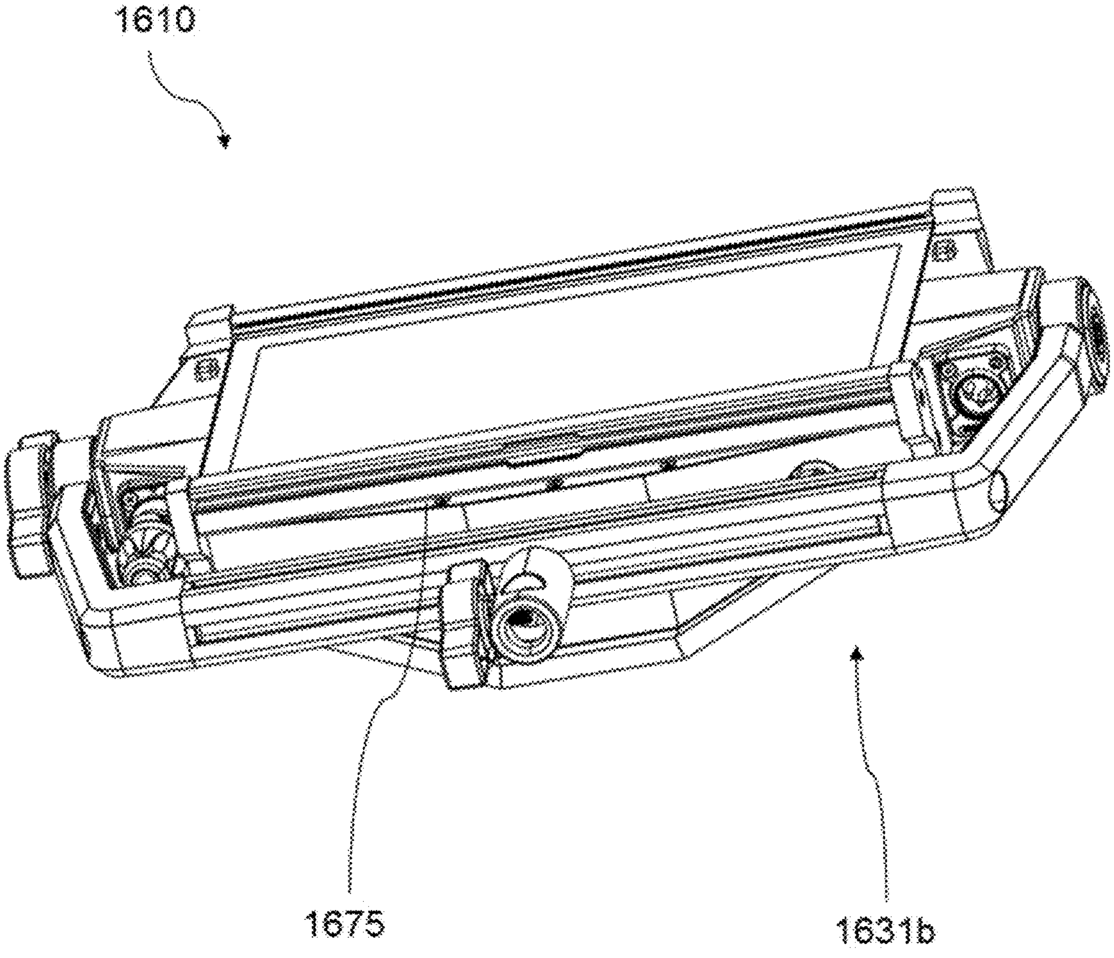

FIG. 18 is a bottom isometric view of the alternate embodiment portable light panel of FIG. 16.

Figure 19:
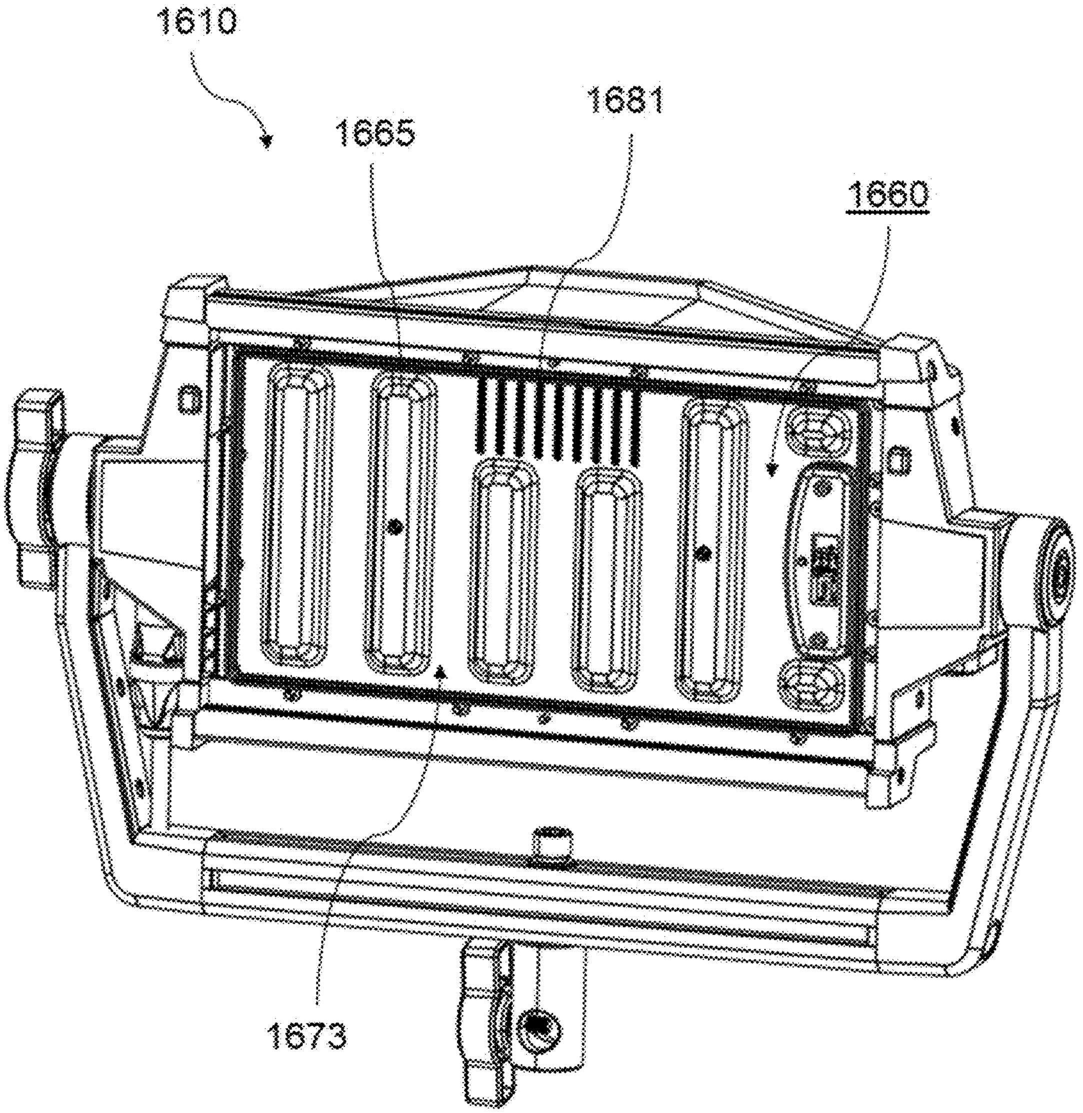

FIG. 19 is a perspective view of the alternate embodiment of the portable light panel of FIG. 16 with light emitting panel and light directing doors removed according to the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

Portable light panel 10 is shown in FIG. 1. As will be described further below, the portable light panel 10 includes inlet openings along the periphery of the portable light panel that enable ambient air to flow into a housing flow channel and then against electric components that control the light emitted by the portable light. As a result, the relatively cool ambient air effectively maintains the operating temperature of the components below a temperature that would likely cause damage to the electric components.

As shown in FIGS. 1, 4 and 7 the portable light panel 10 comprises a housing 20, electrical components 30 and light emitting panel 40 located adjacent electrical components 30. The electrical components 30, control the attributes of the light emitted from the light emitting panel 40. The light emitting panel 40 and electrical components 30 are located adjacent the front portion of the housing 20. As shown in FIG. 2, the portable light 10 has a rectangular peripheral configuration. Optionally each portion of the periphery of the housing may include a movable door 11A, 11B, 11C and 11D. The doors have a rectangular shape that is similar to the shape of the light emitting panel. The doors are provided to selectably direct the light emitted from the light emitting panel 40 to an object that is to receive the emitted light. Each of the doors 11A, 11B, 11C, and 11D is hingeably connected to the housing 20 to be movable toward and away from the light emitting panel 40. The door may be located in a closed orientation where the door is in a plane that is parallel to the plane defined by the light-emitting panel 40 or in an orientation that forms an obtuse angle with the light emitting panel 40.

The portable light panel 10 is shown in FIG. 2 with the light emitting panel 40 removed from the housing. As shown most clearly in FIGS. 2, 6 and 7, the housing 20 has a v-shaped lateral configuration. The housing includes a back panel, shown in FIG. 3, end panels **24*a*, 24*b* shown in FIGS. 2 and 7 respectively, and side peripheral portions 26*a*, 26*b*** extending between the end panels. The side peripheral portions are shown in FIG. 3 and FIG. 4. U-shaped handles 28*a*, 28*b* are included along each side of the housing 20. Each handle has a pair of ends 29*a*, 29*b*. The ends 29*a*, 29*b* of the respective handles 28*a*, 28*b* are connected to the side peripheral portions 26*a*, 26*b* by conventional fasteners such as screws or bolts. When the handles are connected to the housing 20, in combination the housing and respective handles form openings 27*a* and 27*b*. Handle 28*a* and peripheral portion 26*a* form opening 27*a*. Peripheral portion 26*b* and handle 28*b* form opening 27*b*. In use, an operator of the portable light 10 can support the light by gripping the light at the openings 27*a*, 27*b*. The operator can walk and hold the light using the handles.

The rear wall 22 of the housing 20 extends beyond the end panel 24*a* and end panel 24*b*. As shown in FIG. 2, each end of the housing wall includes central surface 23*c*, and tapered surfaces 23*a*, 23*b*. The central surfaces 23*c* are located the greatest longitudinal distance from respective end panels 24*a*, 24*b*. The tapered surfaces 23*a*, and 23*b* extend from the central surface 23*c*, and extend at an angle toward peripheral portions 26*a*, 26*b* respectively. Laterally extending rib members 25*a*, 25*b* extend between the peripheral portions 26*a*, 26*b*. Rib 25*a* is located proximate end panel 24*a*, and rib 25*b* is located proximate end panel 24*b*. As shown in FIG. 3, the top surface 31*a*, 31*b* of each rib 25*a*, 25*b* respectively is located longitudinally inward from center surface 23*c*. As shown in FIGS. 3 and 7, the portable light panel may be placed on a surface 100 by locating the central surface 23*c* and rib surface 31*b* in contact with the surface 100. Additionally, a u-shaped yoke 13 may be removably connected to the handles 28*a*, 28*b* by conventional fasteners. The yoke 13 may be in turn connected to a stand or rotated away from bottom end panel 24*b* when the portable light is supported on a surface as shown in FIG. 7. Further, a trapezoidal shaped hub 19 may be disposed on end panel 24*a*, as shown in FIGS. 1 and 2.

The rear portion 22 of the housing 20 is shown in FIG. 3. A display interface 36, such as an LCD is provided along the rear wall 22. The display interface may provide menus selectable by the light operator to adjust the attributes of the light emitted by the portable light 10. Rotation of knob 35, enables the user to move through menus displayed on the display interface 36. The knob 35 may be pressed to select a desired light operation option. Separate control knobs 32 and 34 are used to respectively control the dimming level or color temperature of the light panel 40. Rotation of knob 32 enables the user to adjust the brightness of the emitted light from 0-100% and rotation of knob 34 enables the user to adjust the color temperature of the LED's to cause the color of the emitted light to range from tungsten to daylight. The updated dimming and color temperature values are displayed on display interface and visible by the light operator. A removable cap 38 covers a communication module. The communication module may enable Wi-Fi control of the light 10 and also include outlets, ports or other connectors when not in use. The outlets may comprise known usb-c or power outlets for example. The removable cap 38 has a trapezoidal shape similar to the trapezoidal shape of hub 19. When the cap 38 is removed, the cap 38 may be seated and stored on hub 19. As a result, the cap 38 may be effectively and efficiently relocated on the outlets when they are no longer in use. As shown in FIG. 5, the cap sealingly engages the housing 15 that is supporting and enclosing the components that comprise the communication module. As shown in FIG. 5, the free ends of the cap 38 include flanges 101*a*, 101*b* that overlay the free ends of the wall of the communication module housing 15. As a result the components of the communication module are protected from water or other particulate matter.

As shown in FIG. 6, the bottom end panel 24*b* includes a power switch 42 for selectively providing power to the portable light 10. Also provided on the base is a first connector 43 that may be a three-pin XLR connector for use connecting a battery to the portable light to provide 10-30 V of DC current to the portable light 10. Also provided along end panel 24*b* is a second connector 44 that may comprise a connector for providing AC current 90-260 V and 50-60 Hz to the portable light 10. The connectors are disclosed for exemplary purposes and may comprise any required connector for supplying power to the portable light.

The light emitting panel comprises a plurality of light-emitting components 41 such as a plurality of light emitting diodes (LED's). See FIG. 4. The LED's are controlled by circuit board and other electronics (collectively "electrical components") 30 that are located immediately adjacent the components 41. The plurality of light emitting components are spaced along the entirety of the light emitting panel 40 in a portable light housing. During use, the electrical components 30 produce heat that causes their temperature to increase. As a result, the electrical components 30 need to be actively cooled to prevent the operating temperature of the electrical components 30 from rising to a level that would lead to heat-related damage to the electrical components 30.

Turning now to FIG. 4, the structure for enabling the component cooling will be described. The housing 20 includes a v-shaped panel 60 that is oriented substantially parallel to the rear wall 22. The panel 60 comprises center panel 61*c*, and side panels 61*a* and 61*b* that extend from the center portion and are made integral with respective peripheral portions 26*a*, 26*b*. An interior housing wall 63 is located adjacent panel 60 and is oriented perpendicular to the panel 60. The interior housing wall 63 impedes the flow of inlet ambient air toward the end panel 26*b* as it is drawn into the housing. A frame 69 supports a fan 70. The frame may be connected to the wall 63 in a conventional manner. As supported by the frame, the fan 70 is located proximate the center panel 61*c* of the panel 60. The fan 70 and center panel 61*c* are separated by a distance that permits air to flow therebetween. Electrical components 30 are located proximate the fan 70. A distance separates the fan and electrical components to enable air to flow therebetween. The panel 60, wall 63 and frame 69 define an air intake chamber 73.

Ambient air inlets 71*a*, 71*b* are provided along respective peripheral portions 26*a* and 26*b*. Ambient air enters the intake chamber 73 through the inlets in the direction of arrows 74*a*, 74*b*. In operation, the rotating fan draws ambient air into the intake chamber 73 through inlets 71*a*, 71*b*. The air is drawn toward the fan, passes through the fan and is exhausted from the fan and directly against the electrical components 30 to maintain the temperature of the electrical components at an acceptable operating temperature. The air is exhausted from the fan in direction 75.

The portable light includes electronics (not shown) located proximate rear housing wall 22 and the electronics 30 that are located adjacent the front of the housing 20. A number of discrete members for making electrical connections between the electronics may be used. The members, such as wires are passed through a number of the discrete openings 90 that are provided in membrane 91. The membrane 91 includes a plurality of aligned, spaced apart openings 90. The membrane may be provided on a housing structural member located between the front and rear portions of the housing. In use, a pressure difference may exist between the rear portion of the portable light and the front portion of the portable light proximate the electronics 30, light emitting panel 40 and air intake chamber. In order to balance any pressure differential that may exist, a number of the openings 90 in membrane 91 do not include connectors and remain open, thereby permitting air to pass from the housing portion of relative high pressure to the portion of the housing of relative low pressure to balance the pressure, eliminating any stress on portable light component parts such as seals for example.

FIGS. 8-15 disclose an alternate embodiment portable light 810 of the present disclosure. The alternate embodiment portable light 810 includes the electronics 30, control knobs 32, 34, 35, Wifi cap 38, membrane 91, and components associated therewith and previously described. As a result no further description of these components and features will be made relative to the portable light panel 810. In the present embodiments of the disclosure the light panels 10, 810 are shown with an aspect ratio of width to height of 1:1.

As shown in FIG. 8, the portable light panel 810 includes a housing 820 with top portion 831*a*, bottom portion 831*b*, first side portion 826*a*, second side portion 826*b*, and rear portion 822. The rear portion 822, and first and second side portions 826*a*, 826*b* extend between the top and bottom portions 831*a* and 831*b*. A light emitting panel 840 is supported by the housing 820 along the front of the housing opposite the rear portion 822. The rear portion 822 terminates at the bottom portion 831*b* at central surface 823*c*, and tapered surfaces 823*a* and 823*b*. The central surface 823*c* and tapered surfaces 823*b* and 823*a* are configured in the manner previously described relative to respective central and tapered surfaces 23*c*, 23*a* and 23*b* of portable light panel 10. First and second side portions 826*a* and 826*b* include lower ambient air inlets 871*a*, 871*b* are provided along respective first and second side portions 826*a* and 826*b*. Ambient air may enter housing 820 through lower ambient air inlets 871*a*, 871*b*. Additionally, as shown in FIG. 11, bottom portion 831*b* includes an ambient air slot 875 extending along a width of bottom portion 831*b* between surfaces 837*a*, 837*b*. Ambient air may additionally enter and exit housing 820 through ambient air slot 875.

Handles 828*a*, and 828*b* are formed along the respective side portions 826*a*, 826*b*. The handles may be gripped by an operator when the position or orientation of the portable light 810 needs to be adjusted or when the light needs to be relocated to a new location. Handles 828*a* and 828*b* may include upper ambient air inlets 872*a*, 872*b* are provided along respective handles 826*a* and 826*b*. Ambient air may enter housing 820 through upper ambient air inlets 872*a*, 872*b*.

As shown in the bottom view of FIG. 11, the bottom portion may include a hub 819. The hub has a rectangular shape. The hub 819 is located proximate rear portion 822. When the portable light panel 810 is seated on a surface, the light panel may be fully seated on the hub 819, central surfaces 823*c*, as well as the bottom surfaces 837*a* and 837*b* of the respective side portions 826*a* and 826*b*. The surfaces 823*c*, 837*a*, and 837*b* are shown seated on base 1000 represented in dashed font in FIG. 8.

The rear portion 822 includes a groove 900 that extends along the rear portion 822 between the top portion 831*a* and the bottom portion 831*b*. As shown in FIG. 9 and FIG. 10, the groove 900 is located proximate side portion 826*b*. It should be understood that the groove may be located in any suitable location along the rear portion 822. The groove 900 overlays a recessed portion 906 in the housing 820. The recessed portion extends the full length of the groove. The groove 900 includes a narrow portion 902. A groove wide portion 904 is located along groove narrow portion 902 near the end of the groove 900 near housing bottom portion 831*b*. The groove wide portion 904 has a lateral dimension that is greater than the lateral dimension of the groove narrow portion 902. The groove wide portion may be located at any suitable location along the length of the groove 900. The groove 900 includes groove edge 912. The wide portion of the groove is suitably wide to receive a fastener as described further below.

FIG. 12 schematically represents an accessory 1200 for the portable light 810. The accessory 1200 may be comprise a battery. The accessories may be conveniently stored along the rear portion 822 of the housing by securing the accessory to the groove. As shown in FIG. 12, the accessory 1200 may comprise a cover 1202 with a sealing member (not shown) to ensure that the accessory is protected from liquid when the accessory is located along the rear portion. The cover 1202 includes a pair of flanges 1210 that support fasteners 1204 which may comprise any suitable fastener such as an allen nut for example. A washer 1206 may be included along the length of each fastener 1204, and separated from the underside of each flange by a gap 1206. The groove edge 912 is located in the gap 1206 when the accessory 1200 is positioned along the groove.

When it is desired to locate an accessory for later use along the housing of the portable light 810, one of the washers 1208 is located in the wide groove portion 904 and the groove edge 912 is located in the gap between the washer and underside of the associated flange 1210. The accessory is then slid along the groove narrow portion toward top portion 831*a*. When the next flange 1210 and fastener 1204 approach the wide groove portion 904 the groove edge 912 is located in the gap 1206 between the associate washer 1208 and the underside of the associated flange 1210. The accessory continues along groove 900 toward top portion 831*a* until the accessory is in the desired location. The fasteners 1204 can then be tightened to secure the accessory in place. The accessory 1200 is presented in dashed font in FIG. 10. If the accessory is a battery, when the battery powering the portable light needs to be replaced, the fasteners may be loosened to removed the accessory from the groove and used to replace the battery without losing power to the portable light.

The portable light panel 810 is shown in FIGS. 13-15 with the light emitting panel removed from the housing. Portable light panel 810 may include a housing panel 860 that provides support for a fan 870. The housing panel 860 may be connected to the housing 820 in a conventional manner and a define a front electronic housing and a back electronic housing. As supported by the panel 860, the fan 870 is located proximate a center of panel 860, in a U-shaped opening formed in panel 860. Further, panel 860 may include a cover plate 877 attached to panel 860 in a conventional manner. Panel 860, U-shaped opening, and cover plate 877 in combination define an air chamber 873 that permits air to flow therebetween into and/or from fan 870. Electrical components 30 are located proximate the fan 870. A distance separates the fan 870 and electrical components 30 to enable air to flow therebetween to and/or from fan 870.

Additionally, as described above, portable light 810 may include electronics (not shown) located within back electronic housing that are proximate rear housing wall 822 and the electronics 30 that are located within front electronic housing that may require ambient air flow to maintains the operating temperature of these components. Panel 860 may direct a portion of ambient air that enters housing 820 through lower air inlets 871*a*, 871*b* and upper air inlets 872*a*, 872*b* through a first heat sink 881 and a second heat sink 883 for electronic components located within back electronic housing for cooling of these electronic components. First heat sink 881 is positioned on a portion of housing panel 860 to allow fluidic communication with ambient air flow within portable light panel 810. Second heat sink 883 is disposed within intake chamber 873 to allow for fluidic communication with ambient airflow within intake chamber 873. Fan 870 may be operated in a first direction to actively draw ambient air through lower air inlets 871*a*, 871*b* and upper air inlets 872*a*, 872*b*, pass the ambient air over the electrical components 30 to maintain the temperature of the electrical components 30 at an acceptable operating temperature, and panel 860 may direct the ambient air into fan 870. While operating fan 870 in the first direction, ambient air is drawn toward through the fan 870 and exhausted into air chamber 873, passes through second heat sink 883, and exits the air chamber 873 through apertures 879*a* and 879*b*. Additionally, fan 870 may be operated in a second direction to actively draw ambient air through lower air inlets 871*a*, 871*b* and upper air inlets 872*a*, 872*b* and panel 860 may direct a portion of ambient air into the air chamber 873 through apertures 879*a* and 879*b*. While operating fan 870 in the second direction, ambient air is drawn toward the fan 870 though air chamber 873, passes through second heat sink 883, passes through the fan 870 and is exhausted from the fan 870 and directly against the electrical components 30 to maintain the temperature of the electrical components 30 at an acceptable operating temperature.

FIGS. 16-19 disclose an alternate embodiment portable light 1610 of the present disclosure. The alternate embodiment portable light 1610 includes the electronics 30, control knobs 32, 34, 35, membrane 91, groove 900 and components associated therewith and previously described. As a result no further description of these components and features will be made relative to the portable light panel 1610. In the present embodiments of the disclosure, the light panel 1610 is shown with an aspect ratio of width to height of 1:2.

As shown in FIG. 16, the portable light panel 1610 includes a housing 1620 with top portion 1631*a*, bottom portion 1631*b*, first side portion 1626*a*, second side portion 1626*b*, and rear portion 1622. The rear portion 1622, and first and second side portions 1626*a*, 1626*b* extend between the top and bottom portions 1631*a* and 1631*b*. A light emitting panel 1640 is supported by the housing 1620 along the front of the housing opposite the rear portion 1622. The rear portion 1622 terminates at the bottom portion 1631*b* at central surface 1623*c*, and tapered surfaces 1623*a* and 1623*b*. The central surface 1623*c* and tapered surfaces 1623*b* and 1623*a* are configured in a manner similar to previously described relative to respective central and tapered surfaces 23*c*, 23*a* and 23*b* of portable light panel 10. Bottom portion 1631*b* includes an ambient air slot 1675 extending along a width of bottom portion 1631*b*. Ambient air may additionally enter and exit housing 1620 through ambient air slot 1675.

The portable light panel 1610 is shown in FIG. 19 with the light emitting panel removed from the housing. Portable light panel 1610 includes a housing panel 1660 connected to the housing 1620 in a conventional manner. Housing panel 1660 defines a front electronic housing and a back electronic housing. Housing panel 1660 and light emitting panel 1640 define an intake chamber 1673 that permits air to flow therebetween.

Additionally, as described above, portable light 1610 may include electronics (not shown) located within back electronic housing that are proximate rear housing wall 1622 and electronics 30 that are located within front electronic housing that may require ambient air flow to maintain the operating temperature of these components. Panel 1660 includes ridges 1665 to promote flow of ambient air that enters housing 1620 through ambient air slot 1675. Additionally, ambient air flow may be directed through a heat sink 1681 to dissipate heat from electronics located within back electronic housing. Heat sink 1681 may be positioned on a portion of panel 1660 to allow fluidic communication with ambient air flow within portable light panel 810. As air is drawn in through ambient air slot 1675, ambient air may flow directly against the electrical components 30 to maintain the temperature of the electrical components 30 at an acceptable operating temperature.

While the embodiments have been described with reference to preferred embodiments, it will be understood by those skilled in the art that various changes may be made, and equivalents may be substituted for the elements thereof without departing from the scope of the present disclosure. In addition, many modifications may be made to adapt the teaching of the embodiments to particular use, application, manufacturing conditions, use conditions, composition, medium, size, and/or materials without departing from the essential scope and spirit of the disclosed embodiments Therefore, it is intended that the disclosed embodiments are not limited to the exemplary embodiments and best mode contemplated for carrying out this disclosure as described herein. Since many modifications, variations, and changes in detail can be made to the described examples, it is intended that all matters in the preceding description and shown in the accompanying figures be interpreted as illustrative and not in a limiting sense.

What is claimed is:

1. A portable light panel comprising:

a. a housing having a rear portion, a front portion, peripheral portions between the front and rear portions, and at least one rib extending between the peripheral portions, the peripheral portions including ambient air inlets, the housing comprising a housing panel and a cover plate attached to housing panel defining an air intake chamber between the housing panel and cover plate;

b. a light-emitting panel;

c. electronic components to control the light emitted by the light-emitting panel, a first portion of the electronic components being located proximate the air intake chamber between the housing and the light emitting panel, and wherein the ambient air is drawn into the air intake chamber and directed onto the first portion of electronic components to maintain the first portion of electronic components at a desired operating temperature;

d. a fan configured to actively draw the ambient air into the air intake chamber through the ambient air inlets and direct the ambient air onto the electronic components;

e. a first heat sink positioned on a portion of the housing panel, wherein the first heat sink dissipates heat from a portion of the electronic components located proximate the rear portion of the housing; and f. a second heat sink positioned within the air intake chamber, wherein the heat sink further dissipates heat from the portion of the electronic components located proximate the rear portion of the housing.

2. The portable light panel as claimed in claim 1, wherein the housing further comprises handles are formed along each of the peripheral portions.

3. The portable light panel as claimed in claim 2, wherein each of the handles includes an upper ambient air inlet.

4. The portable light panel as claimed in claim 3, further comprising a groove provided along the rear portion.

5. The portable light panel as claimed in claim 4, wherein the light emitting panel has a width extending along the at least one rib, a height extending along the peripheral portions, and an aspect ratio of the width to the height of 1:1.

6. A portable light panel comprising:

a. a housing having a rear portion, a front portion, a bottom portion, and peripheral portions between the front and rear portions, the bottom portion including an ambient air slot for ambient air to enter and exit the housing, the housing comprising a housing panel defining a back of an air intake chamber, the housing panel comprising at least one ridge for directing the ambient air drawn into the air intake chamber;

b. a light-emitting panel;

c. electronic components to control the light emitted by the light-emitting panel, a first portion of the electronic components being located proximate the air intake chamber between the housing and the light emitting panel, and wherein the ambient air is drawn into the air intake chamber and directed onto the electronic components to maintain the electronic components at a desired operating temperature.

7. The portable light panel as claimed in claim 6, further comprising a heat sink positioned on a portion of the housing panel, wherein the heat sink is in fluidic communication with the ambient air to dissipate heat from a second portion of the electronic components located within a back electronic housing.

8. The portable light panel as claimed in claim 6, wherein the rear portion comprises a central surface, and tapered surfaces extending from the central surface towards the peripheral portions.

9. The portable light panel as claimed in claim 6, further comprising a groove provided along the rear portion.

10. The portable light panel as claimed in claim 6, wherein the light emitting panel has a width extending along the bottom portion, a height extending along the peripheral portions, and an aspect ratio of the width to the height of 2:1.

* * * * *